United States Patent
Huang

[11] Patent Number: 6,138,943
[45] Date of Patent: Oct. 31, 2000

[54] FOLDABLE ASCENDING/DESCENDING WING STAND FOR FLYING APPARATUS

[76] Inventor: Yung-Chi Huang, No. 3-3, Alley 1, Lane 25, Sec.1, Fu-Shin South Road, Taipei, Taiwan

[21] Appl. No.: 09/209,479

[22] Filed: Dec. 11, 1998

[51] Int. Cl.$^7$ ..................................................... B64C 37/00
[52] U.S. Cl. ........................ 244/2; 244/17.25; 244/17.27; 244/93; 244/7 C
[58] Field of Search ............................ 244/17.11, 17.25, 244/17.27, 54, 55, 7 C, 2, 93

[56] References Cited

U.S. PATENT DOCUMENTS

| | | | |
|---|---|---|---|
| 1,891,166 | 12/1932 | Leupold | 244/7 C |
| 2,569,882 | 10/1951 | Bothezat | 244/17.25 |
| 3,045,950 | 7/1962 | Jennings, Jr. | 244/17.11 |
| 3,298,633 | 1/1967 | Dastoli et al. | 244/2 |
| 3,430,894 | 3/1969 | Strand et al. | 244/7 C |
| 3,765,622 | 10/1973 | Haines | 244/17.11 |
| 5,782,427 | 7/1998 | Hermach | 244/2 |

*Primary Examiner*—Galen L. Barefoot

[57] ABSTRACT

A fordable ascending/descending wing stand for a flying apparatus is disclosed. The wind stand includes a base supported on a car by a number of supporting rods. A frame is mounted on the base, provided with four propellers capable of generating a required upward and forward force to the flying apparatus. The angle of the propellers are controllable by a number of hydraulic actuators mounted on the frame. A tail helm is arranged on the frame for controlling the frying orientation of the car during flying. The base is further provided with a leftward/rightward mass center adjusting mechanism and a forward/rearward mass center adjusting mechanism for adjusting the mass center of the car during flying.

4 Claims, 9 Drawing Sheets

FOLDABLE ASCENDING/DESCENDING WING STAND FOR FLYING APPARATUS

BACKGROUND OF THE INVENTION

1. Field of the Invention

The present invention relates to a flying apparatus, and more especially to a flying apparatus with a wing stand installed thereon. The wing stand mainly includes a base, four supporting rods for supporting the base on the flying apparatus, a mass center adjusting mechanism arranged on the base for adjusting a mass center of the flying apparatus during flying, a frame supported by the mass center adjusting mechanism, a plurality of propellers arranged on the frame, and a plurality of actuators for changing the angle of the propellers.

2. Description of the Prior Art

Nowadays, cars have become an important traffic tool for most people. However, there are still many inconveniences in driving car. For example, the traffic flow is frequently very heavy during rush hours. It is also very difficult in parking. Therefore, people often has an eager desire that the car can ascend/descend freely and even fly. If the car can combine the functions of a car and a flying apparatus, it is believed that it will be suitable and accepted by most people, and many problems described above can be overcame.

SUMMARY OF THE INVENTION

Accordingly, the primary object of the present invention is to provide a wing stand for a flying apparatus. The wing stand may be installed on a car body, and thereby the car can lift and fly.

The other object of the present invention is to provide a foldable wing stand structure for a flying apparatus. The wing stand has a frame is supported on the car body by a number of supporting rods. A number of propellers are arranged on corners of the wing stand. By rotating the propellers and changing the inclined angle of the propellers, the flying apparatus is capable of ascending/descending freely and flying under control of the driver.

To achieve the objects above, in a preferred embodiment of the present invention, the wing stand includes a base, four supporting rods for supporting the base on the flying apparatus, a mass center adjusting mechanism arranged on the base for adjusting a mass center of the flying apparatus during flying, a frame supported by the mass center adjusting mechanism, a plurality of propellers arranged on the frame, and a plurality of actuators for changing the angle of the propellers. Preferably, the mass center adjusting mechanism includes a leftward/rightward mass center adjusting mechanism for adjusting the mass center of the flying apparatus in leftward/rightward direction, and a forward/rearward mass center adjusting mechanism for adjusting the mass center of the flying apparatus in forward/rearward direction.

Preferably, the leftward/rightward mass center adjusting mechanism of the mass center adjusting mechanism is composed of two hollow tubes, two guide rods, two linkage rods, a driving rod, and a hydraulic actuator. When the mass center of the wind stand mounted on the base is deviated in the leftward or rightward orientations, the leftward/rightward mass center adjusting mechanism can get a balance in leftward or rightward direction.

The forward/rearward mass center adjusting mechanism of the mass center adjusting mechanism of the present invention is composed of two hollow tubes, two linkage rods, a driving rod, and a hydraulic actuator. When the mass center of the car and the wing stand mounted on the base is deviated in the forward or rearward orientations, the forward/rearward mass center adjusting mechanism can get a forward/rearward balance in forward or rearward direction.

The present invention will be better understood and its numerous objects and advantages will become apparent to those skilled in the art by referring to the following drawings in which:

DETAILED DESCRIPTION OF THE PREFERRED EMBODIMENT

Figure 1:
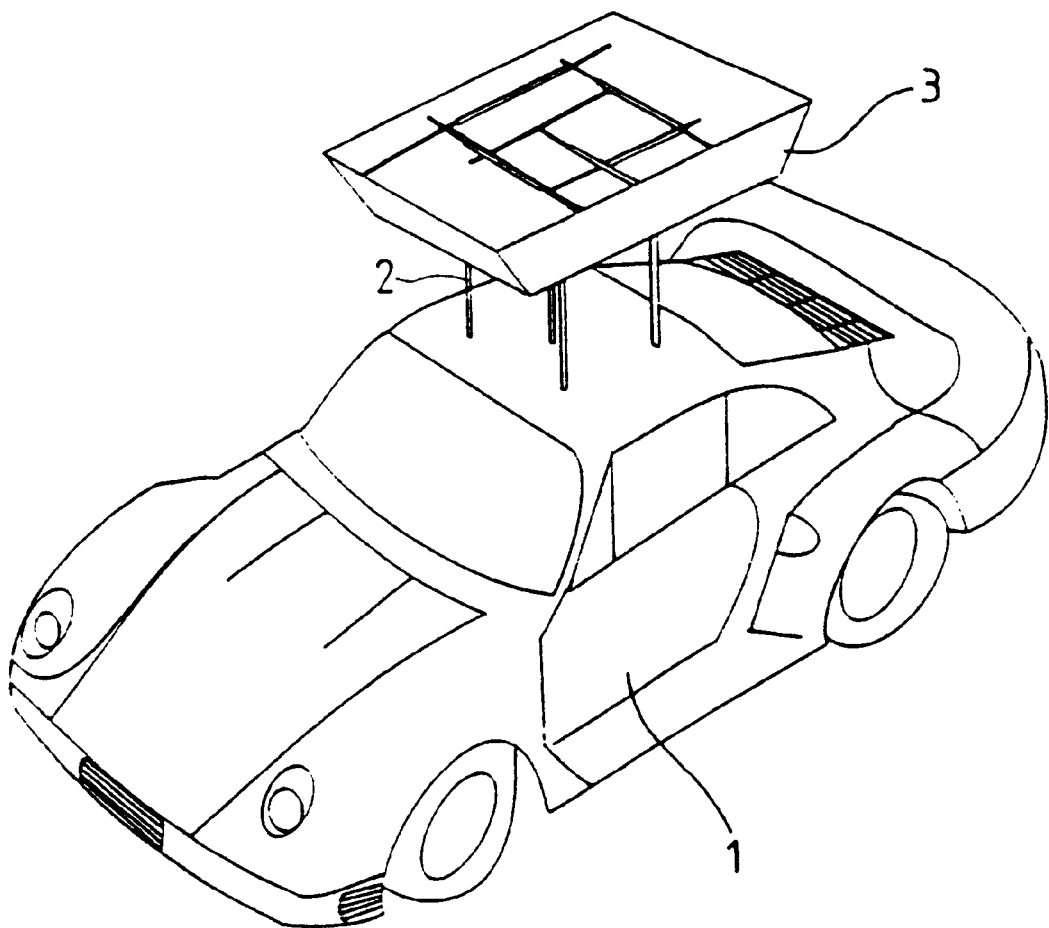
FIG. 1 is a perspective view showing a base is mounted on a car in accordance with the present invention.
Figure 2:
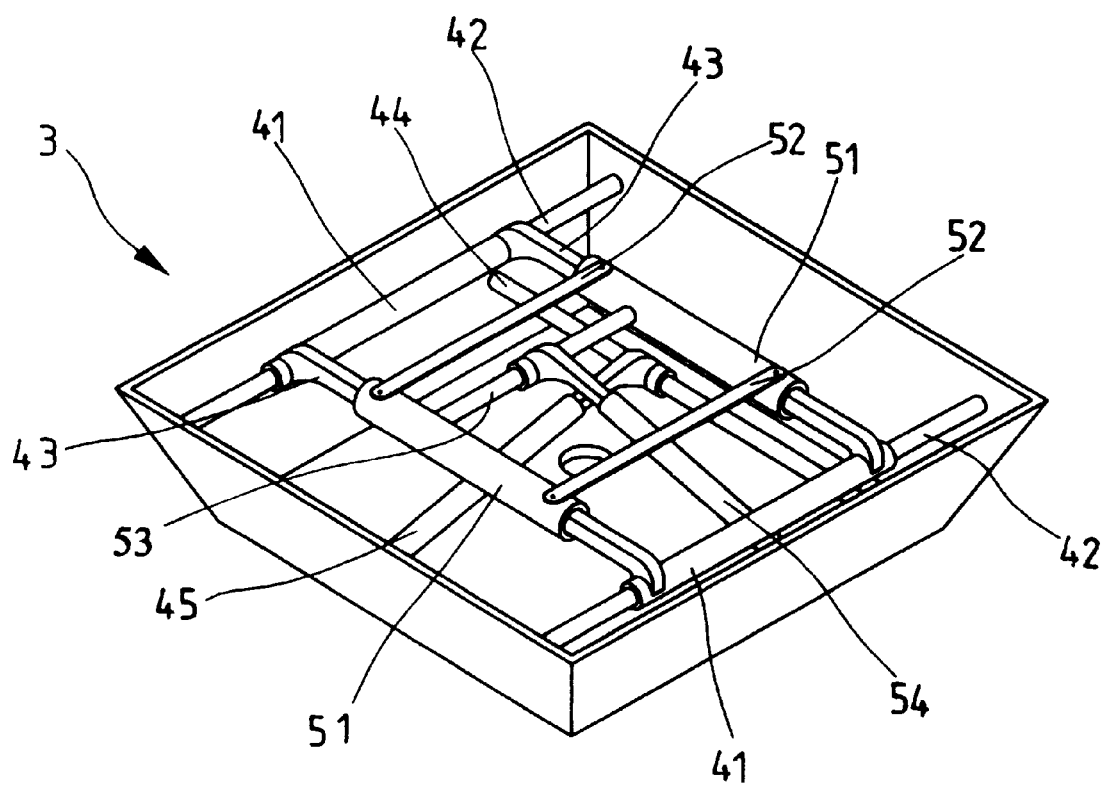
FIG. 2 is a perspective view showing a mass center adjusting mechanism arranged on the base of the present invention.

Referring now to FIG. 1, it shows that a base 3 of the wing stand of the present invention is installed on a car 1 by means of four supporting rods 2. The supporting rods 2 may be made of steel or other suitable material for supporting the base 3 on the car 1. Among the supporting rods, a hollow tube may be arranged between the base 3 and the car. A plurality of electric wires (not shown) for controlling the operation of the wing stand or oil tubes for providing hydraulic pressure power to the wing stand can pass from the car body 1 to the base 3 through the hollow tube.

The base 3 includes a mass center adjusting mechanism for automatically or manually adjusting the mass center of the car during flying. The mass center adjusting mechanism includes a leftward/rightward mass center adjusting mechanism and a forward/rearward mass center adjusting mechanism thereon, which will be described in detail below.

The leftward/rightward mass center adjusting mechanism of the mass center adjusting mechanism is composed of two hollow tubes 41, two guide rods 42, two linkage rods 43, a driving rod 44, and a hydraulic actuator 45. The driving rod 44 is fixed between two hollow tubes 41. The two linkage rods 43 are firmly mounted between two hollow tubes 41. The hydraulic actuator 45 is capable of moving the hollow tubes 41 via the driving rod 44 along the guide rods 42.

When the mass center of the wing stand mounted on the base 3 is deviated in the leftward or rightward orientations, the leftward/rightward mass center adjusting mechanism can be controlled by a control device (not shown) within the car to get a balance in leftward or rightward direction. That is, if the car is inclined leftward due to an unbalance between the left side and right side of the car body, the mass center of the car and the wing stand will be deviated to the left side. At this time, the actuator 45 is capable of controlling the leftward/rightward mass center adjusting mechanism to move rightward so as to balance the mass center of the car. Similarly, if the car is inclined rightward, the mass center of the car will be deviated to the right side. At this time, the actuator 45 is capable of controlling the leftward/rightward mass center adjusting mechanism to move leftward so as to balance the mass center of the car.

The forward/rearward mass center adjusting mechanism of the mass center adjusting mechanism of the present invention is composed of two hollow tubes 51, two linkage rods 52, a driving rod 53, and a hydraulic actuator 54. The driving rod 53 is fixed between the two hollow tubes 51. The two linkage rods 52 are fixed between two hollow tubes 51. The hydraulic actuator 54 is capable of moving the hollow tubes 51 via the driving rod 53 along the linkage rods 43 of the leftward/rightward mass center adjusting mechanism described above.

When the mass center of the car and the wing stand mounted on the base 3 is deviated in the forward or rearward orientations, the forward/rearward mass center adjusting mechanism can be controlled by a control device (not shown) within the car to get a forward/rearward balance. That is, if the car is inclined forward due to an unbalance between the front end and rear end of the car body, the mass center of the car and the wing stand will be deviated to the forward direction. At this time, the actuator 54 is capable of controlling the forward/rearward mass center adjusting mechanism to move rearward so as to balance the mass center of the car. Similarly, if the car is inclined rearward, the mass center of the car will be deviated to the rearward direction. At this time, the actuator 54 is capable of controlling the forward/rearward mass center adjusting mechanism to move forward so as to balance the mass center of the car.

Figure 3:
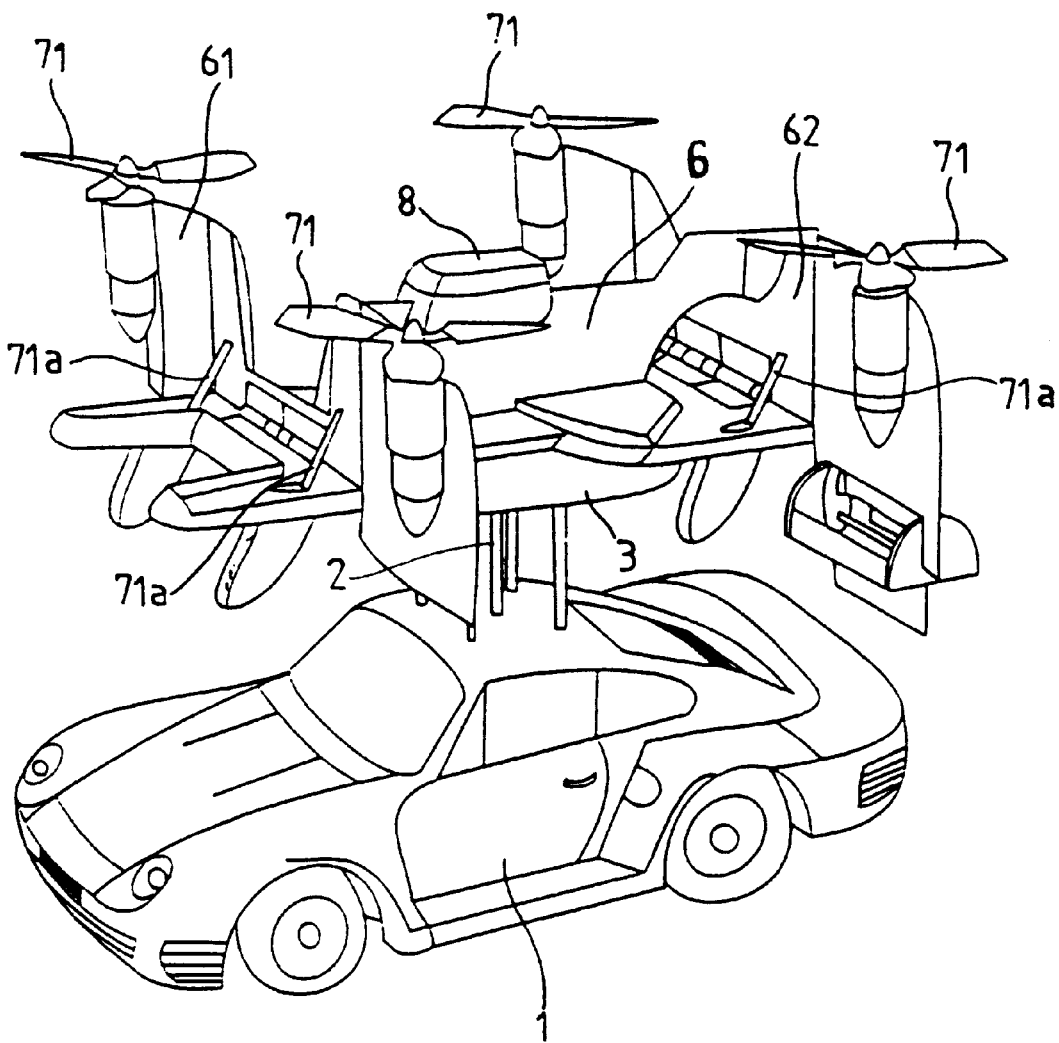
FIG. 3 is a perspective view showing a wing stand installed on the base of the present invention with propellers facing upward.

Referring to FIG. 3, a perspective view showing a wing stand is mounted on the base 3 of the present invention is shown. The wing stand includes a frame 6 mounted on the leftward/rightward mass center adjusting mechanism and the forward/rearward mass center adjusting mechanism. So, the position relative to the base of the wing stand may be moved by the leftward/rightward mass center adjusting mechanism and the forward/rearward mass center adjusting mechanism. Four propellers 71 are arranged at corners of the frame 6. Preferably, the front two propellers are mounted on a front frame 61 of the frame 6, the inclined angle of which may be changed by front hydraulic actuators. Similarly, the rear two propellers are mounted on a rear frame 62 of the frame 6, the inclined angle of which may be changed by rear hydraulic actuators. So, the inclined angle of the propellers 71 is controllable by the driver if desired by actuating the hydraulic actuators 71a.

In operation, each of the propellers 12 is first actuated by the hydraulic actuators 71a at a vertical angle (as shown in FIG. 3) and then rotates rapidly. This will cause the air above the car body to flow more rapidly than that below the car body, thus an upward dynamic lift force will act on to the car body. So, the car may be lifted upward to a desired height.

Figure 4:
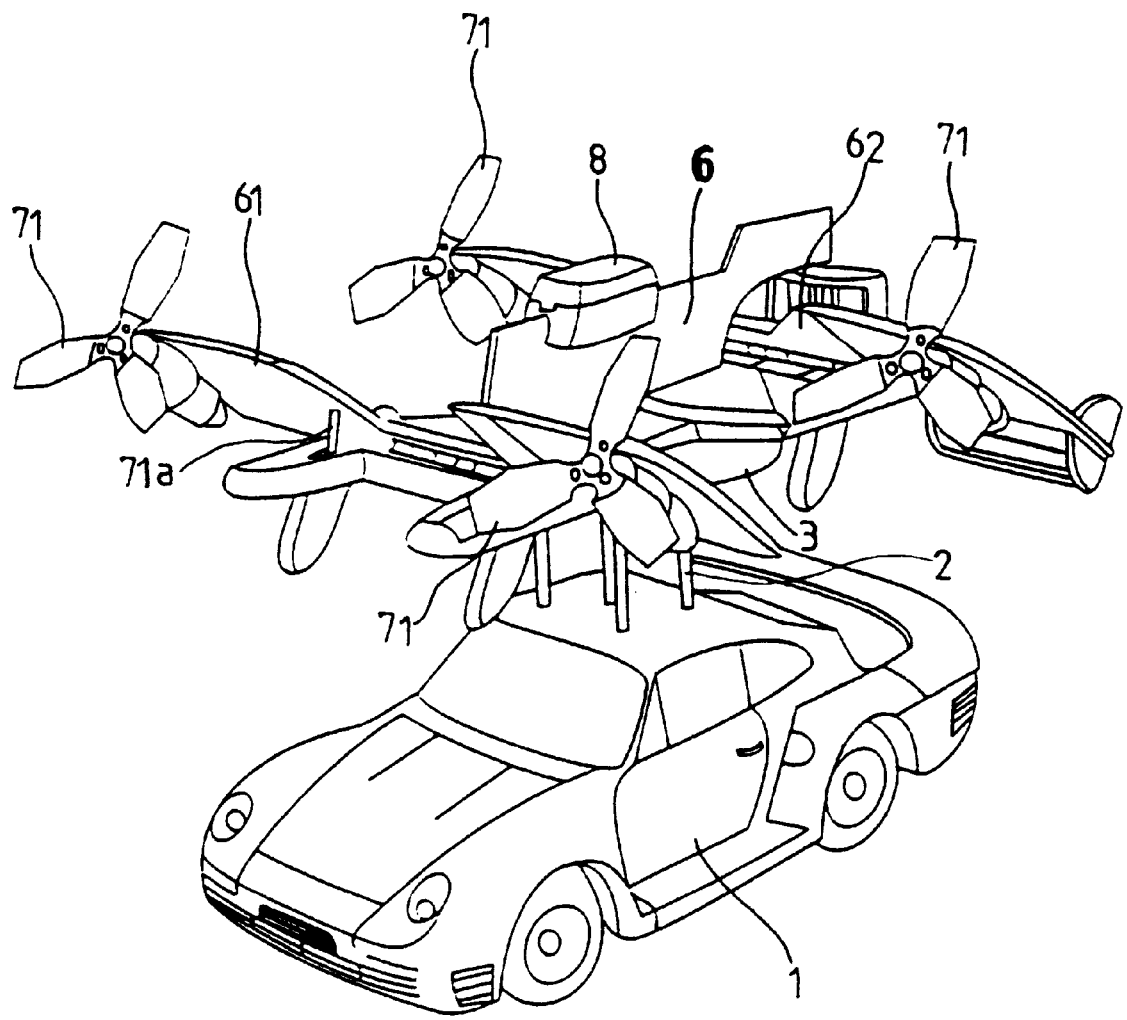
FIG. 4 is a front perspective view showing a wing stand installed on the base of the present invention with propellers facing forward at an inclined angle.
Figure 5:
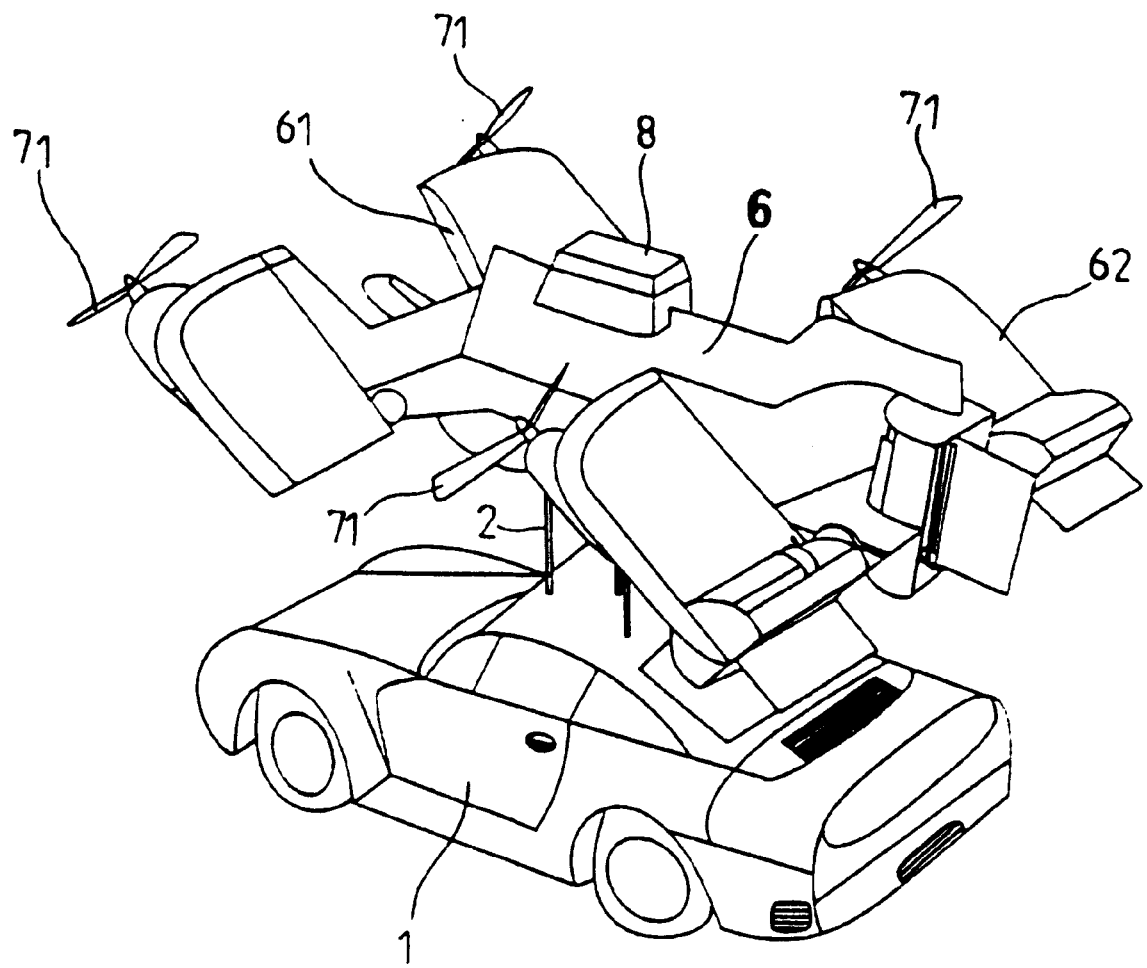
FIG. 5 is a rear perspective view showing a wing stand installed on the base of the present invention with propellers facing forward at an inclined angle.
Figure 6:
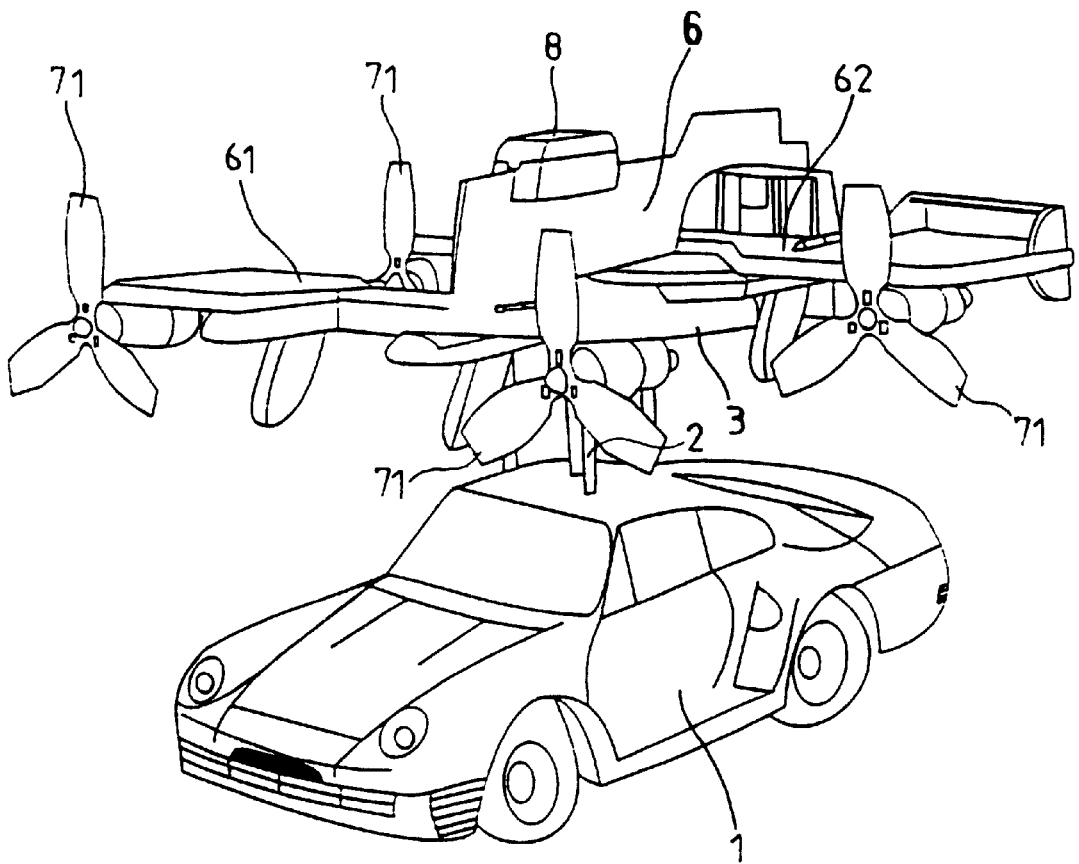
FIG. 6 is a perspective view showing a wing stand installed on the base of the present invention with propellers facing forward horizontally.

At this time, the angle of the propellers 71 may be changed by the hydraulic actuators 71a, as shown in FIGS. 4 and 5, and finally to a horizontal direction, as shown in FIG. 6. At this time, the air in front of the car body will flow more rapid than that behind the car body. So, a forward dynamic force is induced to the car body, so that the car may fly forward. During the flying operation described above, the mass center of the car is adjusted by the leftward/rightward mass center adjusting mechanism and the forward/rearward mass center adjusting mechanism.

Figure 7:
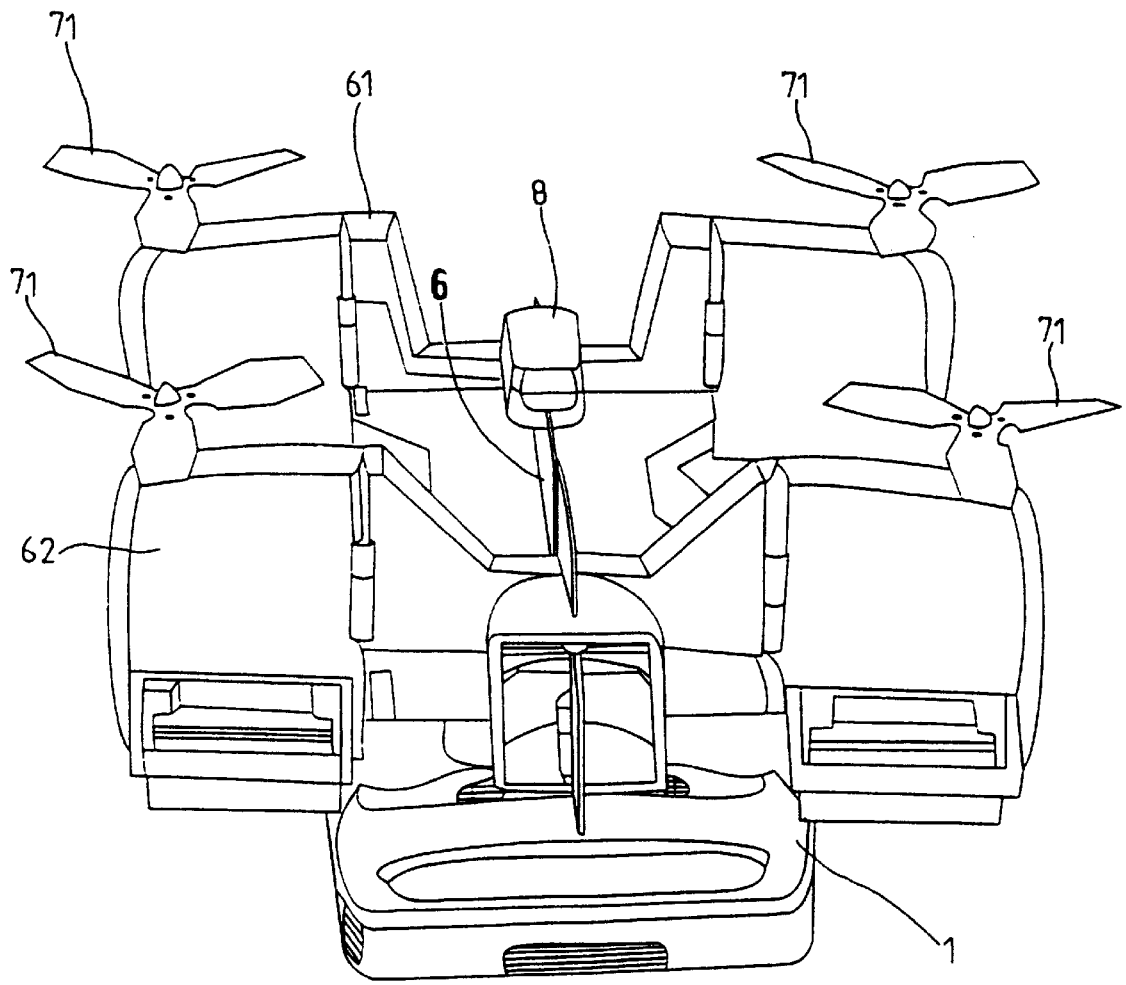
FIG. 7 is a rear perspective view of the present invention, showing a tail helm installed between two rear propellers of the wing stand.

With reference to FIG. 7, there is shown a tail helm 9 is installed on the rear portion between two rear propellers of the wing stand. The function of the tail helm 9 is used to change the flying orientation of the car during flying.

Figure 8:
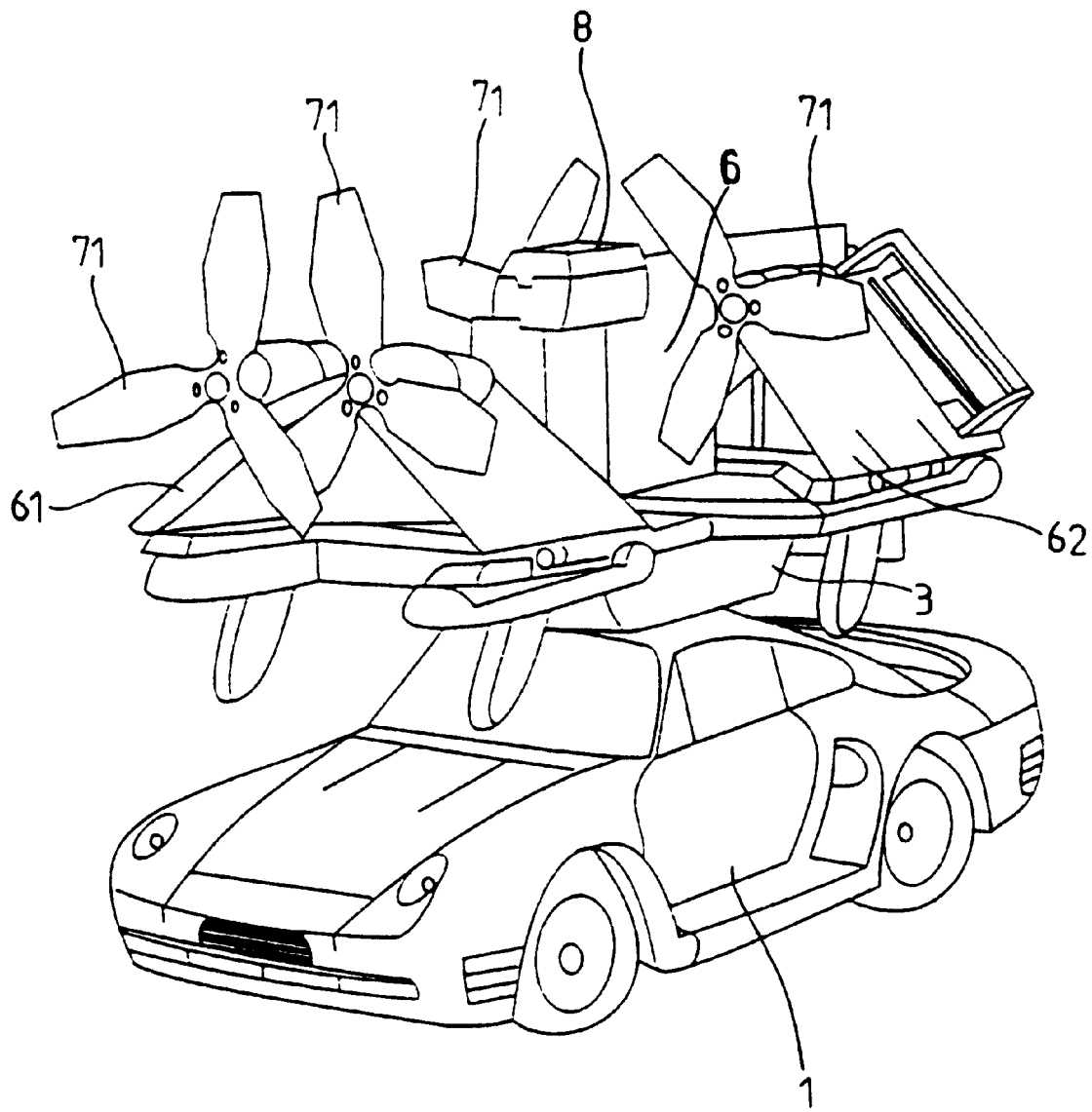
FIG. 8 is a perspective view showing the wing stand of present invention folded upward and inward.

As shown in FIG. 8, a perspective view of the present invention is shown, showing the wing stand mounted on the base of the present invention is folded upward and inward, which can reduce the width of the wing stand when the car is driven on the road.

Figure 9:
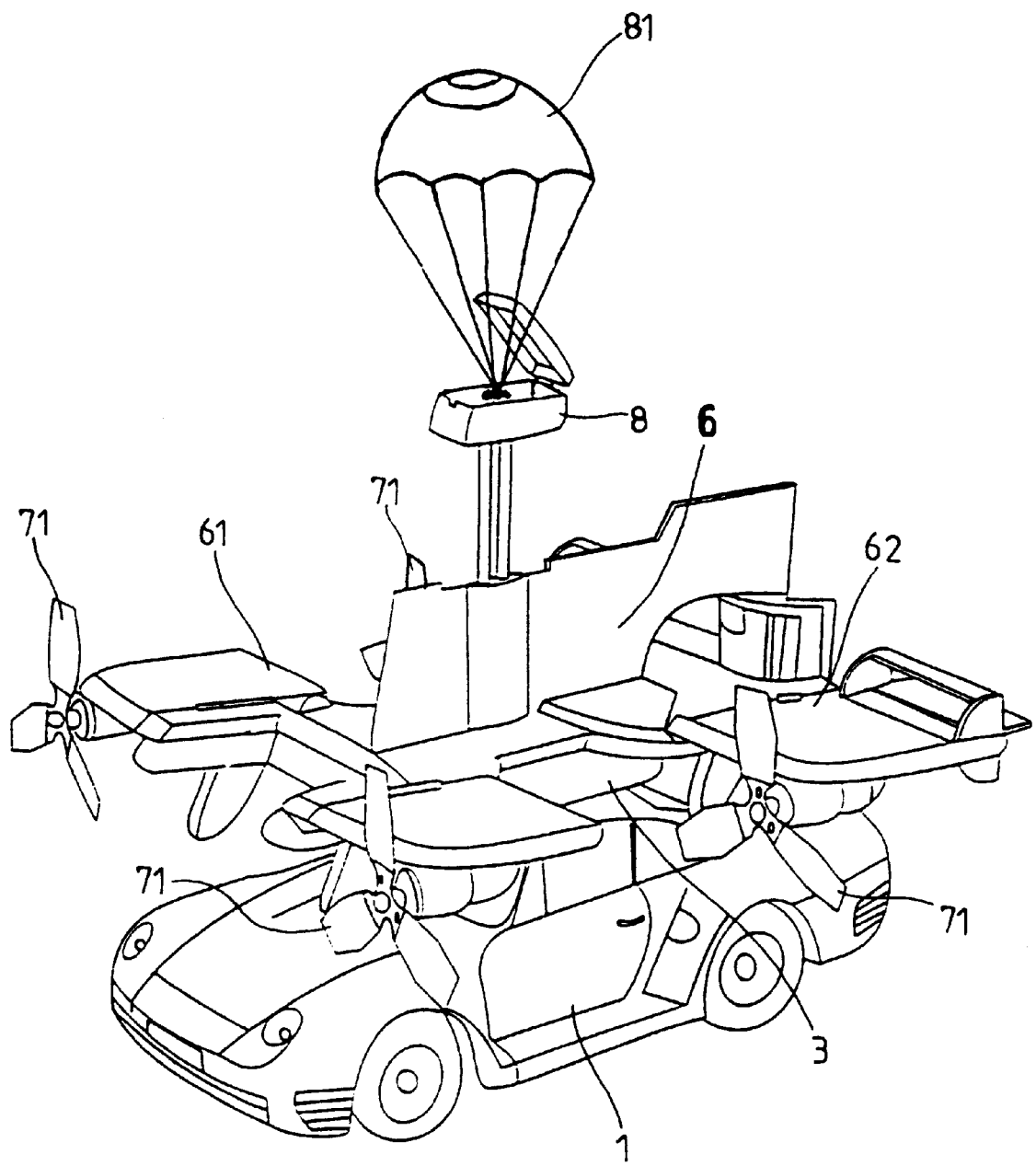
FIG. 9 is a perspective view showing the present invention further includes an emergency parachute which may be contained in a container provided on the wing stand.

Preferably, as shown in FIG. 9, the wing stand of the present invention may further includes an emergency parachute 81 for emergency purpose. The emergency parachute 81 may be contained in a container 8 provided on the wing stand 6, and it may be used by the driver in emergency.

Although the preferred embodiments of the present invention have been described to illustrate the present invention, it is apparent that changes and modifications in the specifically described embodiments can be carried out without departing from the scope of the invention which is intended to be limited only by the appended claims.

What is claimed is:

1. A flying apparatus including a foldable ascending/descending wing stand and comprising:
   a) a road-going vehicle having a vehicle body;
   b) a frame including a plurality of propeller propulsion units mounted on and normally extending laterally outward from the frame so as to be tiltable between a vertical orientation wherein an upward vertical force is generated, and a forward orientation wherein a forward force is generated, at least one of the propeller propulsion units being mounted on a foldable frame portion wherein the at least one propeller propulsion unit is movable between the normally laterally outward position and a laterally inward folded position to thereby reduce a lateral width of the frame, the frame including a tail helm on a rear portion;
   c) a base attached to the vehicle body via a plurality of supporting rods;
   d) a mass center adjusting mechanism mounted on the base, the mass center adjusting mechanism comprising:
      i) a plurality of guide rods extending transversely to a longitudinal centerline of the vehicle;
      ii) a first carriage having first tubes movable mounted on the guide rods, a plurality of first linkage rods connecting the first tubes, a first driving rod and a first actuator acting on the driving rod so as to move the first carriage along the guide rods transversely of the vehicle; and,
      iii) a second carriage movably mounted on the plurality of first linkage rods, the second carriage including second tubes movably located on the plurality of first linkage rods, a plurality of second linkage rods connecting the second tubes, a second driving rod, and a second actuator acting on the second driving rod so as to move the second carriage relative to the first carriage longitudinally of the vehicle, the second carriage being connected to the frame, whereby the mass center is adjusted during flight by moving the entire frame relative to the vehicle in transverse and longitudinal directions.

2. The flying apparatus of claim 1 further comprising a plurality of front propeller propulsion units and a plurality of rear propeller propulsion units wherein all propeller propulsion units are mounted on folding portions of the frame whereby all propeller propulsion units are movable between normally outward positions and laterally inward folded positions.

3. The flying apparatus of claim 2 wherein each folding portion of the frame folds along a longitudinally extending line.

4. The flying apparatus of claim 1 wherein the frame further comprises an emergency parachute.

* * * * *